June 13, 1933.   C. F. MEILINK ET AL   1,913,716
VAULT FRAME DOOR
Filed May 7, 1931
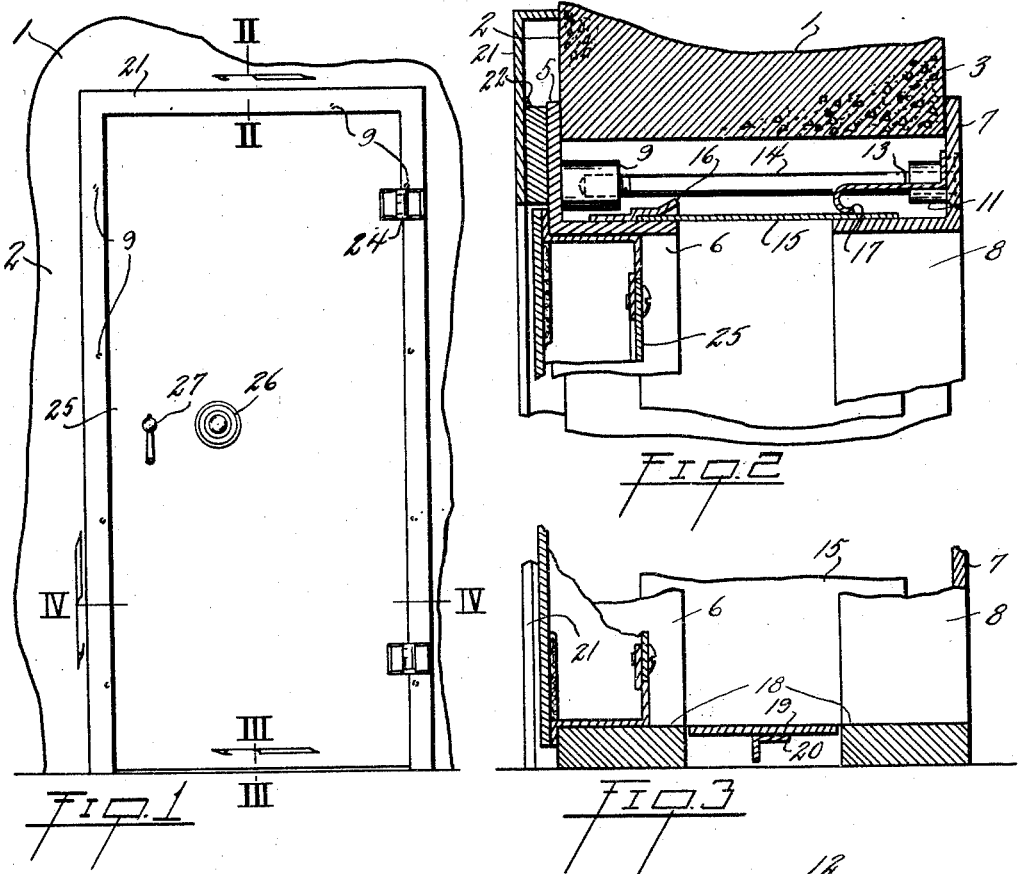
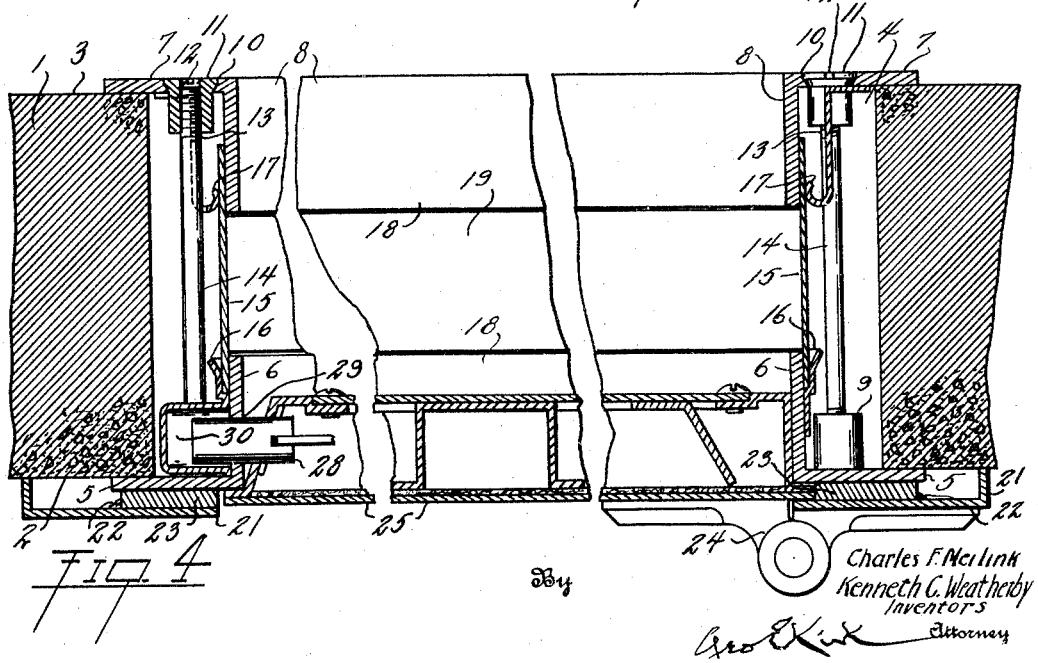
Charles F. Meilink
Kenneth C. Weatherby
Inventors Patented June 13, 1933

1,913,716

UNITED STATES PATENT OFFICE

CHARLES F. MEILINK AND KENNETH C. WEATHERBY, OF TOLEDO, OHIO, ASSIGNORS TO THE MEILINK STEEL SAFE COMPANY, OF TOLEDO, OHIO, A CORPORATION OF OHIO

VAULT FRAME DOOR

Application filed May 7, 1931. Serial No. 535,591.

This invention relates to frames for openings in or through walls.

This invention has utility when incorporated in protective structures, more especially as metallic door frames for assembly in vault walls, being readily conformable to different wall thicknesses for snug anchoring in position at the place of installation, thereby avoiding factory dimensioning as to doorway distance through the wall.

Referring to the drawing:

Fig. 1 is a front view of a vault doorway having an embodiment of the invention incorporated therein;

Fig. 2 is a section on the line II—II, Fig. 1;

Fig. 3 is a section on the line III—III, Fig. 1; and

Fig. 4 is a section on the line IV—IV, Fig. 1.

There is shown structure having wall 1 with outer face 2 and inner face 3 about opening 4, herein shown to provide a doorway in a protective structure, say a vault.

Outer wall abutting flange 5 has therefrom and inwardly extending into the opening 4, throat flange 6. These flanges 5, 6, form an outer angle metal door frame. Inner wall abutting flange 7 with throat flange 8 form an oppositely disposed inner angle metal door frame. Fixed on the inner face of the flange 5 is a series of nuts 9. In alignment therewith, the flange 7 has openings 10 therethrough for nuts 11 having notches or seats 12 for engagement by a screw driver. These nuts 11 are thus rotatable as to the flange 7 in engagement with threaded portion 13 of stud bolts 14 having their threaded portions 14 engaged in the nuts 9.

The vault wall 1 of masonry, masonry and metallic sheathing, reinforcement, and other protective construction material, may have a wide range of thicknesses. For a given dimension opening, the frames 5, 6, and 7, 8, are readily utilized notwithstanding ranges of wall thickness.

To bridge the spacing in the throat of the doorway between the free ends of the flanges 6, 8, there is provided plate or sheet metal throat extension 15 engaging in seats 16 anchored at points along the side of the flange 6 toward the wall 1, thus giving a clear doorway. The extension 15 engaging in these seats 16, protrudes past the flange 6 to have telescoping coaction with the flange 8 on the side thereof toward the wall 1. The plate or extension 15 is yieldably held in snug seating relation with the flange 8 by spring guides 17 between which guides and the flange 8 the extension may ride as the nuts 11 are operated to draw the angle frames toward each other in clamping such frame as a unit in the opening. For the doorway threshold, blocks 18 may have the space therebetween bridged by plate 19 having stiffening angle 20 anchored therebelow. There is thus provided a smooth continuous tread into and out of the vault for ready wheeling of loads therethrough.

Trim 21 may be assembled with the door frame proper by spot welds 22. Bars 23 determine clearance for this trim 21 which is provided with hinges 24 mounting the vault door 25 having tumbler combination lock 26 operable to release spindle 27, so that bolts 28 may be thrown to permit opening of the door 25. The bolts 28 in locking position pass through openings 29 into pockets 30 on the angle flange 6 of the outer door frame. The door and frame with outwardly extending flanges may be set in a wall opening with the outer flange abutting the outer face of the wall and the inner frame set on the inside of the wall with a flange thereof abutting the inside wall. Stay bolts connect the frames to hold them firmly in aligned position and clamp the filler plates therebetween. As so held, mortar or grouting may be used to effect more firm assembly. The door may then be assembled, even by omission of the trim 21, if such be desired.

What is claimed and it is desired to secure by Letters Patent is:

1. In a wall having an opening, a frame therefor comprising a pair of members, one about the opening on each side of the wall, said members each having a wall-engaging flange and a throat-forming flange extending therefrom into the opening, said throat-forming flanges extending toward each other and providing a space therebetween, a space-bridging member about the throat-forming flanges, means positioning said space-bridging member comprising a member on one of said flanges definitely positioning said space-bridging member as to one of the frame members, flexible means coacting with a flange on the opposing frame member to grip the space-bridging member therebetween to resist shifting thereof beyond assembled position, and means extending past the space-bridging member between the members about the opening for drawing said members into assembled position thereby to clamp the space-bridging member between the frame members.

2. In a wall having an opening, a frame therefor comprising a pair of members, one about the opening on each side of the wall, said members each having a wall-engaging flange and a throat-forming flange extending therefrom into the opening, said throat-forming flanges extending toward each other and providing a space therebetween, a space-bridging member about the throat-forming flanges, means positioning said space-bridging member as to the frame members comprising a clip on one of said members forming a seat against which the space-bridging member coacts for definitely spacing such member as to the frame member, a spring finger carried by the other frame member mounted to grip toward the throat-forming flange thereof, between which finger and flange the space-bridging member extends to be held therebetween against normal shifting, and means for drawing the frame members toward each other for frame assembly, said space-bridging member being thereby shiftable into assembled position between the finger and the flange toward which the finger has gripping action.

In witness whereof we affix our signatures.

CHAS. F. MEILINK.
KENNETH C. WEATHERBY.